United States Patent Office 3,467,651
Patented Sept. 16, 1969

3,467,651
1,3-DIAZETIDINE-2-THIONES
Adnan A. R. Sayigh, North Haven, and Henri Ulrich, Northford, Conn., assignors to The Upjohn Company, Kalamazoo, Mich., a corporation of Delaware
No Drawing. Filed Jan. 18, 1965, Ser. No. 426,414
Int. Cl. C07d 47/00
U.S. Cl. 260—239                                      4 Claims

ABSTRACT OF THE DISCLOSURE 1,3,4-trisubstituted - 1,3 - diazetidine-2-thiones are prepared by reacting the appropriate carbodiimide with the appropriate isothiocyanate in approximately stoichiometric proportions at normal room temperatures, optionally in the presence of an organic solvent. Certain 1,3-thiazetidine-2-ones are also disclosed as starting materials in the preparation of certain of the isothiocyanates employed in the above reaction.

The 1,3,4-trisubstituted - 1,3 - diazetidine-2-thiones are useful as curing agents for elastomeric polycarboxylic acids and, by reason of their ready dissociation into their component parts on heating, as a convenient means of storing isothiocyanates in a stable form.

---

This invention relates to a process for the preparation of certain 1,3,4-trisubstituted-1,3-diazetidine-2-thiones, to intermediates in the preparation of said compounds, and to processes for using said compounds as curing agents for elastomeric polycarboxylic acids.

The novel 1,3-diazetidine-2-thiones of the invention can be represented by the following general formula:

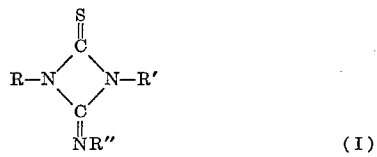

(I)

wherein R is selected from the group consisting of hydrocarbylsulfonyl containing from 1 to 18 carbon atoms, inclusive, halo-, nitro-, alkoxy-, alkylmercapto- and cyano-substituted hydrocarbylsulfonyl wherein the hydrocarbyl moiety contains from 1 to 18 carbon atoms, inclusive, and aryl containing from 6 to 12 carbon atoms, inclusive, wherein the aryl nucleus is substituted by at least one electron-withdrawing group, and R′ and R″ are selected from the class consisting of hydrocarbyl from 1 to 18 carbon atoms, inclusive, and halo-, nitro-, alkoxy-, alkylmercapto-, and cyano-substituted hydrocarbyl containing from 1 to 18 carbon atoms, inclusive.

The term "hydrocarbyl containing from 1 to 18 carbon atoms, inclusive," means the monovalent radical obtained by removing one hydrogen atom from the parent hydrocarbon having the stated carbon atom content. Illustrative of such groups are alkyl groups such as methyl, ethyl, propyl, butyl, pentyl, hexyl, octyl, decyl, dodecyl, hexadecyl, octadecyl, and the like, including isomeric forms thereof; alkenyl groups such as vinyl, allyl, butenyl, pentenyl, hexenyl, octenyl, and the like, including isomeric forms thereof; aralkyl such as benzyl, phenethyl, phenylpropyl, benzhydryl, naphthylmethyl, and the like; aryl such as phenyl, tolyl, xylyl, naphthyl, biphenylyl, and the like; cycloalkyl such as cyclobutyl, cyclopentyl, cyclohexyl, cycloheptyl, cyclooctyl, and the like, including isomeric forms thereof; cycloalkenyl such as cyclopentenyl, cyclohexenyl, cycloheptenyl, and the like, including isomeric forms thereof.

The term "halo-, nitro-, alkoxy-, alkylmercapto-, and cyano-substituted hydrocarbyl containing from 1 to 18 carbon atoms" means a hydrocarbyl radical of the stated carbon atom content as above exemplified, which hydrocarbyl radical is substituted by one or more halo, nitro, alkoxy, alkylmercapto or cyano groups. Illustrative of such substituted hydrocarbyl groups are chloromethyl, trichloromethyl, trifluoromethyl, 2-chloroethyl, 2,3-dichlorobutyl, 5-bromooctyl, 6,7-dibromodecyl, methoxymethyl, 2-ethoxypropyl, 3-ethoxyhexyl, 2-cyanoethyl, 3-cyanopropyl, 2-methylmercaptopropyl, 4-chlorophenyl, 3-fluorophenyl, 4-cyanophenyl, 3-methoxyphenyl, 4-ethoxyphenyl, 2 - chloronaphthyl, 2 - methylmercaptophenyl, 3,4 - dimethoxyphenyl, 3-chlorobenzyl, 4-fluorobenzyl, 2-methoxycyclopentyl, 3-bromocyclohexyl, 4-chlorocyclohexenyl, 2-chloropropenyl, 4-bromobutenyl, 2-chlorovinyl, nitromethyl, 3-nitrobutyl, 4-nitrophenyl, 2-nitronaphthyl, 3-methyl-4-nitrophenyl, 3-nitrocyclopentyl, 2-nitro-1-butenyl, 4-methylmercaptobenzyl, 2-chlorobenzhydryl, 2,4-dibromobenzhydryl and the like.

The term "alkoxy" as used throughout the specification and claims means alkoxy containing from 1 to 8 carbon atoms, inclusive, such as methoxy, ethoxy, propoxy, butoxy, pentyloxy, hexyloxy, heptyloxy, octyloxy, and isomeric forms thereof. The term "alkylmercapto" as used throughout the specification and claims means alkylmercapto containing from 1 to 8 carbon atoms such as methylmercapto, ethylmercapto, propylmercapto, butylmercapto, pentylmercapto, hexylmercapto, octylmercapto, and isomeric forms thereof.

The terms "hydrocarbylsulfonyl containing from 1 to 18 carbon atoms, inclusive" and "halo-, nitro-, alkoxy-, alkylmercapto-, and cyano-substituted-hydrocarbylsulfonyl wherein the hydrocarbyl moiety contains from 1 to 18 carbon atoms, inclusive" mean the radical X—SO$_2$— wherein X represents hydrocarbyl containing from 1 to 18 carbon atoms, inclusive, or halo-, nitro-, alkoxy-, alkylmercapto-, and cyano-substituted-hydrocarbyl containing from 1 to 18 carbon atoms, inclusive, as defined above.

The term "aryl containing from 6 to 12 carbon atoms, inclusive" includes phenyl, tolyl, xylyl, naphthyl, biphenylyl, and the like. The term "electron-withdrawing group" is well-recognized in the art (see, for example, Organic Chemistry, D. J. Cram and G. S. Hammond, McGraw-Hill, 1959, p. 170), and is inclusive of quaternary amino, nitro, nitrato, cyano, carboxyl, carbalkoxy, N,N-dihydrocarbylcarboxamido, halo, acyl, nitroso, trifluoromethyl and the like.

The novel compounds having the Formula I above are useful for a variety of purposes. Illustratively, they can be employed as curing agents for elastomeric polycarboxylic acids using procedures which will be described in detail hereinafter. The novel compounds of the invention are also useful as sources of isothiocyanates. For example the compounds of Formula I dissociate on heating to elevated temperatures of the order of about 130° C. to about 200° C. to form the isothiocyanate R—NCS and the carbodiimide R″N═C═NR′ wherein R′, R″ and R have the significance hereinbefore defined. The latter components are those from which the compounds of Formula I are initially prepared as will be seen below. Thus the compounds of Formula I provide a convenient method of storing isothiocyanates until the latter are required for use. It is thereby possible to avoid the toxicological hazards and related inconveniences normally associated with the storage and handling of isothiocyanates.

The novel compounds of Formula I above can be prepared in a convenient manner by reaction of the appropriate isothiocyanate R—NCS (II) wherein R has the significance defined above, with the appropriate carbodiimide R′N═C═NR″ (III) wherein R′ and R″ have the significance defined above. The reaction is advantageously carried out at room temperature i.e. of the order of 25° C., but higher or lower temperatures can be employed if desired. The reactants (II) and (III) are advantageously employed in approximately stoichiometric proportions. An excess of one or other reactant can be employed if desired but such an excess is usually avoided since it is then necessary to separate the desired compound (I) from the excess reactant.

The reactants (II) and (III) can be brought together alone or can be reacted in the presence of an inert solvent. The use of the latter is not essential but leads to greater convenience in carrying out the desired reaction when one or both of the reactants is a solid at normal room temperature. Suitable inert solvents are benzene, toluene, xylene, chloroform, methylene dichloride, carbon tetrachloride, tetrachloroethane, ether, tetrahydropyran, and the like.

The reaction between the isothiocyanate (II) and the carbodiimide (III) generally occurs very rapidly and its progress can be followed by convenient analytical techniques, for example, by the use of infrared spectral analysis to follow the disappearance of the characteristic isothiocyanate band and thereby indicate the completion of formation of (I). The desired compound (I) can be isolated and purified by conventional methods. For example, when the reaction is performed in the absence of a solvent, the reaction product can be purified by crystallization in the case of solids or by chromatography, fractional distillation under reduced pressure and the like in the case of liquids.

The sulfonylisothiocyanates i.e. the compounds of Formula II above wherein R is $XSO_2$— and X is as hereinbefore defined, which are employed as intermediates in the preparation of the above compounds (I), are themselves novel compounds. In addition to their usefulness as intermediates in the preparation of the compounds of Formula I above the sulfonylisocyanates (II) are also useful as intermediates in a number of syntheses. Illustratively, they can be reacted with ammonia or a primary amine, for example, according to the procedure described by Suter et al., J. Amer. Chem. Soc. 55, 2497, 1933, for the reaction of isothiocyanates with ammonia and amines, to yield the corresponding sulfonyl thioureas. The latter compounds are active as bactericidal and antidiabetic agents and are also useful as intermediates, by reaction with acid halides such as phosgene, phosphorus pentachloride, phosphorus pentabromide, thionyl chloride, and the like, in the preparation of the corresponding sulfonylcarbodiimides. The latter compounds are useful as antidiabetic agents and as stabilizers for polyesters. Polyesters tend to deteriorate under heat and high humidity conditions as well as simple ageing of the product. The sulfonylcarbodiimides obtained as described above can be used to stabilize polyesters against these undesirable characteristics using the procedures set forth in, for example, German Patent 1,005,726 for the stabilization of polyesters using carbodiimides.

The sulfonylisothiocyanates of the Formula (II; $R=XSO_2$—) can be prepared by phosgenation of the corresponding 1-hydrocarbylsulfonyl-3-alkylthiourea according to the following reaction:

(IV) $XSO_2NHCSNHA$-Alkyl+$COCl_2 \rightarrow$
$XSO_2NCS$+Alkyl-$NCO$+$2HCl$

In the above Equation X is as hereinbefore defined and Alkyl represents an alkyl group containing from 1 to 18 carbon atoms, inclusive, such as methyl, ethyl, propyl, butyl, octyl, dodecyl, tetradecyl, octadecyl and the like, including isomeric forms. Advantageously the alkyl group of the 1-hydrocarbylsulfonyl-3-alkylthiourea (IV) is so chosen that the alkyl isocyanate produced in the reaction has a boiling point which enables it to be separated readily from the desired sulfonylisothiocyanate. The above phosgenation is preferably conducted in an inert organic solvent such as benzene, toluene, xylene, chlorobenzene, o-dichlorobenzene, tetrachloroethane, tetrachloroethylene and the like. The reaction temperature employed is generally within the range of about 80° C. to about 180° C. The reaction is carried out conveniently by heating the solution of 1-hydrocarbylsulfonyl-3-alkylthiourea (IV) in inert organic solvent to a temperature within the range indicated and passing phosgene into the heated solution. Reaction occurs rapidly and can be followed by suitable analytical procedures, for example, by analysis of the reaction mixture for isocyanate content. The desired sulfonylisothiocyanate can be isolated from the reaction mixture by conventional procedures, for example, by fractional distillation in the case of liquids, after initial removal of the inert organic solvent.

The 1-hydrocarbylsulfonyl - 3 - alkylthioureas (IV) which are employed as starting materials in the above process can be prepared by conventional procedures, for example, those described in Chem. Rev. 50, 1–46, 1952, and by Petersen, Berichte. 83, 551, 1950. Illustratively, the 1-hydrocarbylsulfonyl-3-alkylthioureas (IV) can be prepared by reacting the appropriate 1-hydrocarbylsulfonamides with the appropriate alkyl isothiocyanate in the presence of aqueous alkali metal hydroxide.

In an alternative method of making the sulfonylisothiocyanates of the Formula II the appropriate 1-hydrocarbylsulfonyl-3-arylthiourea (V) wherein aryl preferably contains from 6 to 12 carbon atoms, inclusive, as hereinbefore defined and exemplified, is phosgenated at a temperature within the range of about 0° C. to about 50° C. to form the corresponding 1,3-thiazetidine-2-one according to the following:

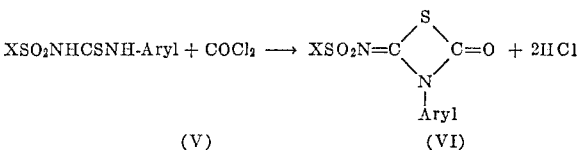

(V) (VI)

The reaction is conducted advantageously in the presence of an inert organic solvent such as those exemplified above. The desired thiazetidine-2-one (VI) can be isolated from the reaction product by conventional procedures, for example, by distilling off the inert solvent and purifying the residue, for example, by recrystallization, chromatography, and the like. The thiazetidine-2-one (VI) can be decomposed by heating at a temperature within the range of about 150° C. to about 200° C. to give a mixture of the desired sulfonylisothiocyanate $XSO_2NCS$ and sulfonylcarbodiimide $XSO_2N$=$C$=$N$-Aryl This mixture can be separated by conventional procedures, for example, by chromatography, fractional distillation in the case of liquids, or fractional crystallization in the case of solids. The decomposition of the thiazetidine-2-one (VI) to produce the sulfonylisothiocyanate can be carried out very conveniently by heating the crude solution of (VI) prepared as described above without the need for the intermediate isolation and purification of this material.

The 1,3-thiazetidine-2-ones (VI), wherein X and Aryl are as hereinbefore defined, are novel compounds which are useful as described above in the preparation of the sulfonyl isothiocyanates (II) employed as intermediates in making the compounds (I) of the invention and, at the same time, in making the corresponding sulfonylcarbodiimides $XSO_2N$=$C$=$N$-Aryl, wherein X and Aryl are as hereinbefore defined. The latter compounds are useful as stabilizers for polyesters and as antidiabetic agents.

The 1-hydrocarbylsulfonyl-3-arylthioureas (V) which are employed as starting materials in the preparation of the thiazetidine-2-ones (VI) can be prepared by conventional procedures such as those described above for the preparation of the corresponding 1-hydrocarbylsulfonyl-3-alkylthioureas.

The carbodiimides (III) which are employed in the preparation of 1,3-diazetidine-2-thiones (I) of the invention, are well-known in the art and can be prepared from the corresponding isocyanates by procedures such as those described in U.S. Patents 2,937,164; 2,853,473; 2,853,518; and 3,056,835.

The aryl isothiocyanates (II: R=aryl substituted by at least one electron-withdrawing group) which are employed in the preparation of 1,3-diazetidine-2-thiones (I) of the invention, are, for the most part, known in the art and can be prepared by conventional procedures; see, for example, Dieckmann et al., Berichte, 40, 3737, 1907; Campbell et al., J. Appl. Polymer Sci., 2, 81, 1959. A particularly convenient method comprises the reaction of the appropriate primary aromatic amine with a thiocarbamoyl halide

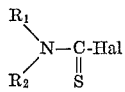

wherein:

is the residue of a strongly basic secondary amine such as diethylamine, diisopropylamine, dibutylamine, dihexylamine, pyrrolidine, 4-methylpiperazine, piperidine, and the like. The reaction is conducted advantageously by bringing the reactants together in the presence of an inert organic solvent, as hereinbefore defined and exemplified, at a temperature of the order of about 50° C. to about 150° C. The desired aryl isothiocyanate so formed can be separated from the secondary amine hydrohalide produced as by-product by conventional procedures, for example, by filtration to remove the insoluble hydrohalide followed by evaporation of the filtrate to remove the inert organic solvent. The residual aryl isothiocyanate can be purified by conventional procedures, for example, by distillation in the case of liquids or by recrystallization in the case of solids.

As stated above, the novel compounds (I) of the invention are useful as curing agents for elastomeric polycarboxylic acids. The latter are a class of elastomers well-recognized in the art the major members of which are interpolymers of one or more monomers at least one of which is an $\alpha,\beta$-unsaturated acid such as acrylic acid, $\alpha$-alkylacrylic acids such as methacrylic acid and the like, haloacrylic acids such as $\alpha$-fluoroacrylic acid, $\alpha$-chloroacrylic acid and the like, $\alpha$-phenylacrylic acid, maleic acid, alkylmaleic acids, halomaleic acids, fumaric acid, alkylfumaric acid, crotonic acid, cinnamic acid, and the like. Other monomers which can be used in the preparation of the polymers include dienes such as butadiene, 2-alkylbutadienes such as 2-methylbutadiene, 2-ethylbutadiene and the like, 2,3-dialkylbutadienes such as 2,3-dimethylbutadiene, 2,3-diethylbutadiene and the like, 2-halobutadienes, and the like, and monounsaturated monomers such as isobutylene, acrylate esters particularly the methyl, ethyl, and the lower-alkyl esters, acrylonitrile, methacrylonitrile, vinylidene cyanide, vinyl halides such as vinyl chloride, vinyl bromide, and the like, styrene, $\alpha$-methylstyrene and the like.

The monomers can be interpolymerized by standard procedures such as those set forth in Manufacture of Plastics, vol. 1, p. 364, edited by W. M. Smith, Reinhold, 1964. Typical of the elastomeric polycarboxylic acids which can be crosslinked using the novel compounds of Formula I are those described in U.S. 2,937,164.

In employing the novel compounds of Formula I as crosslinking agents said compounds are admixed with the elastomer in proportions of about 0.1 to about 10% by weight of elastomer. Proportionately larger amounts of compound (I) can be employed if desired but usually offer no advantage over the proportions indicated above. Where the elastomer is employed as a solution or gel the compound (I) can be admixed therewith by stirring. Where the elastomer is employed in the solid state the crosslinking agent (I) can be added thereto at any suitable point in the curing operation. For example, in the case of elastomer millable gums the crosslinking agents (I) can be added to the elastomer while processing on the 3-roll mill at customary processing temperatures, i.e., of the order of about 25° C. to about 60° C. Alternatively the elastomer and crosslinking agent can be admixed by other conventional methods of mixing, blending and the like at any time prior to curing. Whatever means of bringing the elastomer and crosslinking agent together is adopted, the final curing operation is conducted at a temperature within the range of about 100° C. to about 200° C. to effect the desired crosslinking.

The following examples illustrate the best mode contemplated by the inventors for carrying out their invention but are not to be construed as limiting the scope thereof.

EXAMPLE 1.—p-TOLUENESULFONYLISOTHIO-CYANATE

An excess of phosgene was passed into a refluxing solution (190° C.) of 10 g. (0.035 mole) of 1-p-toluene-slufonyl-3-butylthiourea in 100 ml. of chlorobenzene over a period of 15 minutes. At the end of this time a mixture of chlorobenzene and n-butylisocyanate was distilled away and the residue was fractionally distilled under reduced pressure. There was thus obtained 2.0 g. (29.5% yield) of p-toluenesulfonylisocyanate having a boiling point of 87 to 89° C. at a pressure of 0.5 mm. of mercury and 0.9 g. (12.1%) of p-toluenesulfonylisothiocyanate having a boiling point of 120° C. at 1 mm. of mercury. The infrared spectrum of the latter compound showed an absorption band at $5.25\mu$.

Using the above procedure but replacing 1-p-toluenesulfonyl-3-butylurea by 1-p-methoxybenzenesulfonyl-, 1-o-ethoxybenzenesulfonyl-, 1-p-fluorobenzenesulfonyl-, 1-m-chlorobenzenesulfonyl-, 1-benzenesulfonyl-, 1-m-methylthiobenzenesulfonyl-, 1-p-nitrobenzenesulfonyl-, 1-m-xylylsulfonyl-, 1-(2-naphthylsulfonyl)-, 1-methylsulfonyl-, 1-hexylsulfonyl-, 1-methoxymethylsulfonyl-, 1-(2-ethoxypropyl)sulfonyl-, 1-(2-methylthiopropyl)sulfonyl-, 1-(2-chloroethyl)sulfonyl-, 1-trifluoromethylsulfonyl- and 1-(2-cyanoethyl)sulfonyl-3-butylthiourea (all of which are prepared by reaction of the appropriate hydrocarbylsulfonamide with butyl isothiocyanate in the presence of aqueous sodium hydroxide according to the procedure described by Petersen, supra), there are obtained p-methoxybenzenesulfonylisothiocyanate, o - ethoxybenzenesulfonylisothiocyanate, p - fluorobenzenesulfonylisocyanate, m-chlorobenzenesulfonylisothiocyanate, benzenesulfonylisothiocyanate, m-methylthiobenzenesulfonylisothiocyanate, p-nitrobenzenesulfonylisothiocyanate, m - xylylsulfonylisothiocyanate, 2-naphthylsulfonylisothiocyanate, methylsulfonylisothiocyanate, hexylsulfonylisothiocyanate, methoxymethylsulfonylisothiocyanate, 2 - ethoxypropylsulfonylisothiocyanate, 2 - methylthiopropylsulfonylisothiocyanate, 2 - chloroethylsulfonylisothiocyanate, trifluoromethylsulfonylisothiocyanate, and 2-cyanoethylsulfonylisothiocyanate, respectively.

EXAMPLE 2.—4-NITROPHENYL ISOTHIO-CYANATE

A mixture of 13.8 g. (0.1 mole) of p-nitroaniline, 16.6 g. (0.099 mole) of N-N-diethylthiocarbamoyl chloride and 300 ml. of benzene was stirred and heated slowly to reflux temperature. The stirring and heating at reflux were maintained for 1 hour after which time the reaction mixture was cooled, filtered, and the filtrate concentrated under reduced pressure. The residue was recrystallized from acetone to yield 10.8 g. (60% theoretical) of 4-nitrophenyl isothiocyanate in the form of a crystalline solid having a melting point of 102 to 105° C.

Using the above procedure but replacing p-nitroaniline by o,p-dinitroaniline, ethyl p-aminobenzoate, p-aminobenzoic acid, propyl m-aminobenzoate, p-cyanoaniline, p-chloroaniline, o,p - dichloroaniline, p - bromoaniline, p-fluoroaniline, m - trifluoromethylaniline, p - aminoacetophenone, m-toluidine, 2-chloro-4-methylaniline, p-methylsulfonylaniline, m-methylthioaniline, p-(N,N-dimethylcarboxamido)aniline, p-nitrosoaniline, and phenetidine, there are obtained o,p-dinitrophenyl isothiocyanate, ethyl-4-isothiocyanatobenzoate, p-isothiocyanatobenzoic acid, propyl m-isothiocyanatobenzoate, p-cyanophenyl isothiocyanate, p-chlorophenyl isothiocyanate, o,p-dichlorophenyl isothiocyanate, p-bromophenyl isothiocyanate, p-fluorophenyl isothiocyanate, m-trifluoromethylphenyl isothiocyanate, p-isothiocyanatoacetophenone, m-tolyl isothiocyanate, 2-chloro-4-methylphenyl isothiocyanate, p-methylsulfonylphenyl isothiocyanate, m-methylthiophenyl isothiocyanate, p-(N,N - dimethylcarboxamido)phenyl isothiocyanate, p-nitrosophenyl isothiocyanate, and p-ethoxyphenyl isothiocyanate, respectively.

EXAMPLE 3.—1 - o - TOLYL - 3 - (4 - TOLUENESULFONYL)-4-o-TOLYLIMINO-1,3 - DIAZETIDINE - 2-THIONE

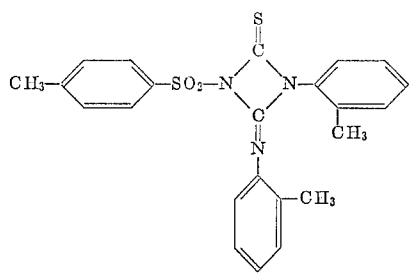

To 0.44 g. (0.002 mole) of di-o-tolylcarbodiimide was added 0.4 g. (0.0019 mole) of p-toluenesulfonyl isothiocyanate. An immediate exothermic reaction occurred and the mixture crystallized upon standing for a short period. The product so obtained was triturated with ether and the insoluble solid (0.65 g.; M.P. 118 to 120° C.) was isolated by filtration and recrystallized from methanol to give 1-o-tolyl-3-p-toluenesulfonyl-4-o-tolylimino-1, 3-diazetidine-2-thione in the form of a crystalline solid having a melting point of 128 to 129° C.

Analysis.—Calcd. for $C_{23}H_{21}O_2N_3S_2$: C, 63.42; H, 4.85; N, 9.64; S, 14.72. Found: C, 63.59; H, 4.83; N, 9.15; S, 14.98.

A 10% solution of the above compound in o-dichlorobenzene was heated for 10 minutes at 180° C. and the resulting mixture was fractionally distilled to yield p-toluenesulfonylisothiocyanate having a boiling point of 120° C. at 1 mm. of mercury.

EXAMPLE 4.—1-ISOPROPYL-4-ISOPROPYLIMINO-3 - (4 - NITROPHENYL) - 1,3 - DIAZETIDINE - 2-THIONE

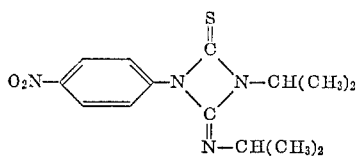

To a solution of 25.2 g. (0.2 mols) of diisopropylcarbodiimide in 126 ml. of benzene was added 36 g. (0.2 mole) of p-nitrophenyl isothiocyanate. The resulting mixture was allowed to stand at room temperature (ca. 25° C.) for 20 hours, at the end of which time the solvent was removed by distillation. The residue (55 g.; M.P. 50 to 51° C.) was recrystallized from methanol to give 1-isopropyl - 4 - isopropylimino - 3 - (4-nitrophenyl)-1, 3-diazetidine-2-thione in the form of a crystalline solid having a melting point of 51 to 52° C.

Analysis.—Calcd. for $C_{14}H_{18}N_4O_2S$: N, 18.25. Found: N, 18.22.

EXAMPLE 5.—1 - CYCLOHEXYL-4-CYCLOHEXYLIMINO-3-(4-NITROPHENYL) - 1,3 - DIAZETIDINE-2-THIONE

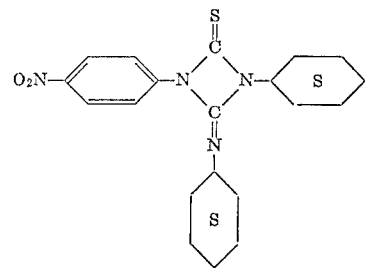

To a solution of 20.6 g. (0.1 mole) of dicyclohexylcarbodiimide in 110 ml. of benzene was added 18 g. (0.1 mole) of p-nitrophenyl isothiocyanate. The mixture was allowed to stand for 20 hours at room temperature (ca. 25° C.) before removing the solvent by distillation. The residue (35.15 g.; M.P. 67 to 69° C.) was recrystallized from methanol. There was thus obtained 1-cyclohexyl-4-cyclohexylimino - 3 - (4 - nitrophenyl) - 1,3 - diazetidine-2-thione in the form of a crystalline solid having a melting point of 73 to 75° C.

Analysis.—Calcd. for $C_{20}H_{26}N_4O_2S$: C, 62.14; H, 6.77; N, 14.52. Found: C, 62.19; H, 6.85; N, 14.33.

EXAMPLE 6.—1 - (3 - CHLOROPHENYL) - 4 - (3-CHLOROPHENYL)IMINO - 3 - (4 - TOLUENESULFONYL)-1,3-DIAZETIDINE-2-THIONE

Using the procedure described in Example 3, but replacing di-o-tolylcarbodiimide by di(3 - chlorophenyl)carbodiimide, there is obtained 1 - (3 - chlorophenyl) - 4 - (3-chlorophenyl) - 3 - (4-toluenesulfonyl)-1,3-diazetidine-2-thione.

EXAMPLE 7.—1 PHENYL - 4 - PHENYLIMINO - 3-(4 - TOLUENESULFONYL) - 1,3 -DIAZETIDINE-2-THIONE

Using the procedure described in Example 2, but replacing di-o-tolylcarbodiimide by diphenylcarbodiimide, there is obtained 1 - phenyl - 4 -phenylimino - 3 - (4 - toluensulfonyl) - 1,3 - diazetidine - 2 - thione.

EXAMPLE 8.—1-p-TOLYL - 4 - p - TOLYLIMINO-3-(4 - TOLUENESULFONYL) - 1,3 - DIAZETIDINE-2-THIONE.

Using the procedure described in Example 3, but replacing di-o-tolylcarbodiimide by di-p-tolylcarbodiimide, there is obtained 1-p-tolyl-4-p-tolylimino-3-(4-toluenesulfonyl)-1,3-diazetidine-2-thione.

EXAMPLE 9.—1 - (2,6 - DIETHYLPHENYL) - 4 -(2, 6 - DIETHYLPHENYL)IMINO - 3 - (4 - TOLUENESULFONYL)-1,3-DIAZETIDINE-2-THIONE.

Using the procedure described in Example 3, but replacing di-o-tolylcarbodiimide by di(2,6-diethylphenyl) carbodiimide, there is obtained 1 - (2,6 - diethylphenyl)-4-(2,6-diethylphenyl)imino - 3 - (4-toluenesulfonyl)-1,3-diazetidine-2-thione.

Similarly, using the procedure described in Example 3, but replacing di - o - tolylcarbodiimide by di(m-cyanophenyl)carbodiimide, di(p - methoxyphenyl)carbodiimide, tert - butylcyclohexylcarbodiimide, tert.-butylisopropylcarbodiimide, cyclohexylphenylcarbodiimide, diallylcarbodiimide, dibutylcarbodiimide, dioctylcarbodiimide, (3 - methoxypropyl) - 1 - naphthyl carbodiimide, and dibenzylcarbodiimide, there are obtained 1 - (3-cyanophenyl) - 4 - (3 - cyanophenyl)imino-, 1 -(4-methoxyphenyl) - 4 - (4-methoxyphenyl)imino-, a mixture of 1 - tert. - butyl - 4 - cyclohexylimino- and 1-cyclohexyl - 4 - tert. - butylimino-, a mixture of 1 - tert. - butyl-4 - isopropylimino- and 1 - isopropyl - 4 - tert. - butylimino-, a mixture of 1 -cyclohexyl - 4 -phenylimino- and 1 - phenyl - 4 - cyclohexylimino-, 1 - allyl - 4 - allylimino-, 1 - butyl - 4 - butylimino-, 1 - octyl - 4 - octylimino, a mixture of 1 - (3 - methoxypropyl) - 4 - (1 -naphthyl) imino- and 1 - (1 - naphthyl) - 4 - (3 - methoxypropyl) imino-, and 1 - benzyl - 4 - benzylimino - 3 - (4 - toluenesulfonyl)-1,3-diazetidine-2-thione, respectively.

EXAMPLE 10.—1 - o - TOLYL - 3 - PHENYLSULFONYL - 4 o - TOLYLIMINO - 1,3 - DIAZETIDINE-2-THIONE

Using the procedure described in Example 3, but replacing p-toluenesulfonyl isothiocyanate by phenylsulfonyl isothiocyanate, there is obtained 1-o-tolyl-3-phenylsulfonyl - 4 - o - tolylimino - 1,3 -diazetidine-2-thione.

Similarly, using the procedure described in Example 3, but replacing p - toluenesulfonyl isothiocyanate by p-methoxybenzenesulfonyl isothiocyanate, o - ethoxybenzenesulfonyl isothiocyanate, p - fluorobenzenesulfonyl isothiocyanate, m - chlorobenzenesulfonyl isothiocyanate, p - nitrobenzenesulfonyl isothiocyanate, m - xylylsulfonyl isothiocyanate, (2 - naphthylsulfonyl) isothiocyanate, methylsulfonyl isothiocyanate, hexylsulfonyl isothiocyanate, methoxymethylsulfonyl isothiocyanate, 2 - ethoxypropylsulfonyl isothiocyanate, 2 - methylthiopropylsulfonyl isocyanate, 2 - chloroethylsulfonyl isothiocyanate, trifluoromethylsulfonyl isothiocyanate, and 2 - cyanoethylsulfonyl isothiocyanate, there are obtained:

1-o-tolyl-3-(p-methoxybenzenesulfonyl)-,
1-o-tolyl-3-(o-ethoxybenzenesulfonyl)-,
1-o-tolyl-3-(p-fluorobenzenesulfonyl)-,
1-o-tolyl-3-(m-chlorobenzensulfonyl)-,
1-o-tolyl-3-(p-cyanobenzenesulfonyl)-,
1-o-tolyl-3-(m-methylthiobenzenesulfonyl)-,
1-o-tolyl-3-(p-nitrobenzenesulfonyl)-,
1-o-tolyl-3-(m-xylylsulfonyl)-,
1-o-tolyl-3-(2-naphthylsulfonyl)-,
1-o-tolyl-3-methylsulfonyl-,
1-o-tolyl-3-hexylsulfonyl-,
1-o-tolyl-3-methoxymethylsulfonyl-,
1-o-tolyl-3-(2-ethoxypropylsulfonyl)-,
1-o-tolyl-3-(2-methylthiopropylsulfonyl)-,
1-o-tolyl-3-(2-chloroethylsulfonyl)-,
1-o-tolyl-3-trifluoromethylsulfonyl-, and
1-o-tolyl-3-(2-cyanoethylsulfonyl)-4-
   o-tolylimino-1,3-diazetidine-2-thione, respectively.

EXAMPLE 11.—1-o-TOLYL-3-(4-CHLOROPHENYL)-4-o-TOLYLIMINO-1,3-DIAZETIDINE-2-THIONE

Using the procedure described in Example 3, but replacing p-toluenesulfonyl isothiocyanate by p-chlorophenyl isothiocyanate, there is obtained 1-o-tolyl-3-(4-chlorophenyl)-4-o-tolylimino-1,3-diazetidine-2-thione.

Similarly, using the procedure described in Example 3 but replacing p-toluenesulfonyl isothiocyanate by o,p-dinitrophenyl isothiocytnate,
ethyl-4-isothiocyanatobenzoate,
p-isothiocyanatobenzoic acid,
propyl m-isothiocyanatobenzoate,
p-cyanophenyl isothiocyanate,
o,p-dichlorophenyl isothiocyanate,
p-bromophenyl isothiocyanate,
p-fluorophenyl isothiocyanate,
m-trifluoromethylphenyl isothiocayanate,
p-isothiocyanatoacetophenone,
m-tolyl isothiocyanate,
2-chloro-4-methylphenyl isothiocyanate,
p-methylsulfonylphenyl isothiocyanate,
m-methylthiophenyl isothiocyanate,
p-(N,N-dimethylcarboxamido)phenyl isothiocyanate,
p-nitrosophenyl isothiocyanate, and
p-ethoxyphenyl isocyanate,
there are obtained
1-o-tolyl-3-(2,4-dinitrophenyl)-,
1-o-tolyl-3-(4-carbethoxyphenyl)-,
1-o-tolyl-3-(4-carboxyphenyl)-,
1-o-tolyl-3-(4-carbopropoxyphenyl)-,
1-o-tolyl-3-(4-cyanophenyl)-,
1-o-tolyl-3-(2,4-dichlorophenyl)-,
1-o-tolyl-3-(4-bromophenyl)-,
1-o-tolyl-3-(4-fluorophenyl)-,
1-o-tolyl-3-(3-trifluoromethylphenyl)-,
1-o-tolyl-3-3(4-acetylphenyl)-,
1-o-tolyl-3-m-tolyl-,
1-o-tolyl-3-(2-chloro-4-methplphenyl)-,
1-o-tolyl-3-(4-methylsulfonylphenyl)-,
1-o-tolyl-3-(3-methylthiophenyl)-,
1-o-tolyl-3-(4-N,N-dimethylcarboxamidophenyl)-,
1-o-tolyl-3-(4-nitrosophenyl)-, and
1-o-tolyl-3-(4-ethoxyphenyl)-4-o-tolylimino-1,3-diazetidine-2-thione, respectively.

EXAMPLE 12

A. 3-phenyl-4-(p-toluenesulfonyl)imino-1,3-thiazetidine-2-one

A solution of 2.8 g. (0.028 mole) of phosgene in 35 ml. of dry chlorobenzene was added dropwise with stirring and cooling at 4° C. over a period of 8 minutes to a solution of 8.5 g. (0.028 mole) of 1-p-toluenesulfonyl-3-phenylthiourea in 50 ml. of dry chlorobenzene. The resulting mixture was stirred for a further 1 hour before removing the solvent by distillation. The residue (9 g.; melting point 128 to 131° C.) was recrystallized from ethyl acetate. There was thus obtained 3-phenyl-4-(p-toluenesulfonylimino)-1,3-thiazetidine-2-one in the form of a crystalline solid having a melting point of 137 to 139° C.

Analysis.—Calcd. for $C_{15}H_{12}N_2O_3S_2$: C, 54.19; H, 3.62; N, 8.42; S, 19.29. Found: C, 54.09; H, 3.65; N, 8.52; S, 18.95.

The infrared absorption spectra of the above compound (solution in chloroform) exhibited maxima at 5.49, 6.15, 6.68, 7.2, 8.63, and 9.23$\mu$.

B. p-toluenesulfonyl isothiocyanate

A solution of 20 g. of 3-phenyl-4-p-toluenesulfonylimino-1,3-thiazetidine-2-one (prepared by combining the producet from several runs carried out as described in part A above) in 100 ml. of o-dichlorobenzene was heated at 180° C. for 1 hour before being fractionally distilled under reduced pressure to isolate p-toluenesulfonyl isothiocyanate having a boiling point of 120° C. at a pressure of 1 mm. of mercury.

EXAMPLE 13.—BENZENESULFONYL ISOCYANATE

Using the procedure described in Example 12, part A, but replacing 1-p-toluenesulfonyl-3-phenylthiourea by 1-benzenesulfonyl-3-phenylthiourea, there is obtained 3 - phenyl-4-benzenesulfonylimino-1,3-thiazetidine-2-one. The latter is then converted using the procedure described in Example 12, part B, to obtain benzenesulfonyl isothiocyanate.

Similarly, using the procedure described in Example 12, part A, but replacing 1-p-toluenesulfonyl-3-phenylthiourea by 1-p-methoxybenzenesulfonyl,
1-o-ethoxybenzenesulfonyl-,
1-p-fluorobenzenesufonyl-,
1-m-chlorobenzenesulfonyl-,
1-p-cyanobenzenesulfonyl-,
1-m-methylthiobenzenesulfonyl-,
1-p-nitrobenzenesulfonyl-,
1-m-xylylsulfonyl-,
1-(2-naphthylsulfonyl)-,
1-methylsulfonyl-,
1-hexylsulfonyl-,
1-methoxymethylsulfonyl-,
1-(2-ethoxypropyl)sulfonyl-, 1-(2-methylthiopropyl)sulfonyl-,
1-(2-chloroethyl)sulfonyl-,
1-trifluoromethylsulfonyl-, and
1-(2-cyanoethyl)sulfonyl-3-phenylthiourea (all of which are prepared by reaction of the appropriate hydrocarbylsulfonamide with phenylisothiocyanate in the presence of aqueous sodium hydroxide according to the procedure described by Petersen, supra), there are obtained:

3-phenyl-4-(p-methoxybenzenesulfonylimino)-,
3-phenyl-4-(o-ethoxybenzenesulfonylimino)-,
3-phenyl-4-(p-fluorobenzenesulfonylimino)-,
3-phenyl-4-(m-chlorobenzenesulfonylimino)-,
3-phenyl-4-(p-cyanobenzenesulfonylimino)-,
3-phenyl-4-(m-methylthiobenzenesulfonylimino)-,
3-phenyl-4-(p-nitrobenzenesulfonylimino)-,
3-phenyl-4-(m-xylylsulfonylimino)-,
3-phenyl-4-(2-naphthylsulfonylimino)-,
3-phenyl-4-methylsulfonylimino-,
3-phenyl-4-hexylsulfonylimino-,
3-phenyl-4-methoxymethylsulfonylimino-,
3-phenyl-4-(2-ethoxypropylsulfonyl)imino-,
3-phenyl-4-(2-methylthiopropylsulfonyl)imino-,
3-phenyl-4-(2-chloroethylsulfonyl)imino-,
3-phenyl-4-trifluoromethylsulfonylimino-, and
3-phenyl-4-(2-cyanoethylsulfonyl)imino-1,3-thiazetidine-2-one, respectively.

The 1,3-thiazetidine-2-ones obtained as described above are then decomposed, using the procedure described in Example 12, part B, to obtain the corresponding hydrocarbylsulfonyl isothiocyanates namely:

p-methoxybenzenesulfonyl isothiocyanate,
o-ethoxybenzene sulfonyl isothiocyanate,
p-fluorobenzenesulfonyl isothiocyanate,
m-chlorobenzenesulfonyl isothiocyanate,
p-cyanobenzenesulfonyl isothiocyanate,
m-methylthiobenzenesulfonyl isothiocyanate,
p-nitrobenzenesulfonyl isothiocyanate,
m-xylylsulfonyl isothiocyanate,
2-naphthylsulfonyl isothiocyanate,
methylsulfonyl isothiocyanate,
hexylsulfonyl isothiocyanate,
methoxymethylsulfonyl isothiocyanate,
2-ethoxypropylsulfonyl isothiocyanate,
2-methylthiopropylsulfonyl isothiocyanate,
2-chloroethylsulfonyl isothiocyanate,
trifluoromethylsulfonyl isothiocyanate, and
2-cyanoethylsulfonyl isothiocyanate, respectively.

We claim:
1. A 1,3-diazetidine-2-thione having the formula:

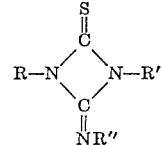

wherein R is selected from the group consisting of hydrocarbyl-sulfonyl containing from 1 to 18 carbon atoms, inclusive, halo-, nitro-, lower-alkoxy-, lower-alkylmercapto-, and cyano-substituted hydrocarbyl sulfonyl wherein the hydrocarbyl moiety contains from 1 to 18 carbon atoms, inclusive, and aryl containing from 6 to 12 carbons, inclusive, wherein the aryl nucleus is substituted by a member selected from the group consisting of cyano, carboxyl, lower-carbalkoxy, N,N-di(lower-alkyl)carboxamido, lower-alkylsulfonyl, nitroso, and trifluoromethyl, and R' and R" are selected from the class consisting of hydrocarbyl containing from 1 to 18 carbon atoms, inclusive, and halo-, nitro-, lower-alkoxy-, lower-alkyl-mercapto-, and cyano-substituted hydrocarbyl containing from 1 to 18 carbon atoms, inclusive, and wherein hydrocarbyl in each instance is selected from the group consisting of alkyl from 1 to 18 carbon atoms, inclusive, alkenyl from 2 to 8 carbon atoms, inclusive, aralkyl from 7 to 13 carbon atoms, inclusive, aryl from 6 to 12 carbon atoms, inclusive, cycloalkyl from 4 to 8 carbon atoms, inclusive, and cycloalkenyl from 5 to 7 carbon atoms, inclusive.

2. 1 - o - tolyl - 3-p-toluenesulfonyl-4-o-tolylimino-1,3-diazetidine-2-thione.

3. 1-isopropyl - 4 - isopropylimino-3-(p-nitrophenyl)-1,3-diazetidine-2-thione.

4. 1 - cyclohexyl - 4 - cyclohexylimino-3-(p-nitrophenyl)-1,3-diazetidine-2-thione.

References Cited

FOREIGN PATENTS 1,012,601  7/1957  Germany.
1,138,390  10/1962  Germany.

OTHER REFERENCES

Conant: The Chemistry of Organic Compounds, revised ed. (New York, 1939), pages 264, 269 and 272.

Lowy et al.: Introduction to Organic Chemistry, sixth edition (New York, 1945), page 213.

ALTON D. ROLLINS, Primary Examiner

U.S. Cl. X.R.

260—45.8, 78.4, 78.5, 80, 82.1, 82.3, 83.5, 87.5, 87.7, 88.1, 327, 454, 464, 465, 465.1, 465.9, 545, 552, 566; 424—321